(12) United States Patent
Tsuruma

(10) Patent No.: US 12,261,549 B2
(45) Date of Patent: Mar. 25, 2025

(54) CONTROL DEVICE FOR APPLYING A POWER CONVERSION DEVICE AND POWER CONVERSION SYSTEM TO CONTROL AN AMPLITUDE AND A FREQUENCY OF A VOLTAGE

(71) Applicant: TMEIC Corporation, Chuo-ku (JP)

(72) Inventor: Yoshinori Tsuruma, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 185 days.

(21) Appl. No.: 17/996,396

(22) PCT Filed: Aug. 25, 2020

(86) PCT No.: PCT/JP2020/032071
§ 371 (c)(1),
(2) Date: Oct. 17, 2022

(87) PCT Pub. No.: WO2022/044135
PCT Pub. Date: Mar. 3, 2022

(65) Prior Publication Data
US 2023/0208319 A1 Jun. 29, 2023

(51) Int. Cl.
*H02M 7/53* (2006.01)
*H02J 3/38* (2006.01)
(Continued)

(52) U.S. Cl.
CPC ........... *H02M 7/53871* (2013.01); *H02J 3/38* (2013.01); *H02J 3/46* (2013.01); *H02M 7/493* (2013.01)

(58) Field of Classification Search
CPC .............. H02M 7/493; H02J 3/46; H02J 3/38
See application file for complete search history.

(56) References Cited

U.S. PATENT DOCUMENTS

| 2016/0006338 A1 | 1/2016 | Sakimoto et al. |
| 2017/0141679 A1* | 5/2017 | Adest ................... H02M 7/493 |
| 2020/0204057 A1 | 6/2020 | Kato et al. |

FOREIGN PATENT DOCUMENTS

| JP | 10-201105 A | 7/1998 |
| WO | WO-2017217013 A1 * | 12/2017 ............... H02M 7/48 |

OTHER PUBLICATIONS

International Search Report (with English Translation) and Written Opinion issued Oct. 27, 2020 in PCT/JP2020/032071 filed on Aug. 25, 2020, 8 pages.

(Continued)

*Primary Examiner* — Kyle J Moody
*Assistant Examiner* — Jye-June Lee
(74) *Attorney, Agent, or Firm* — Oblon, McClelland, Maier & Neustadt, L.L.P.

(57) ABSTRACT

A control device for a power conversion device includes a voltage recognizing unit configured to detect a voltage at a linkage point of the plurality of power converters, and a control unit configured to control an amplitude and a frequency of a voltage to be output by a power converter to be controlled on the basis of active power and reactive power output by the power converter to be controlled in a case that the power converter to be controlled is caused to perform autonomous operation as a voltage source, and controls active power and reactive power to be output by the power converter to be controlled so as to compensate for excess or deficiency of active power and reactive power at the linkage point on a basis of an amplitude and a frequency of the voltage detected by the voltage recognizing unit.

12 Claims, 14 Drawing Sheets

(51) Int. Cl.
    *H02J 3/46*          (2006.01)
    *H02M 7/493*       (2007.01)
    *H02M 7/5387*     (2007.01)

(56) References Cited

OTHER PUBLICATIONS

Extended European Search Report dated Sep. 23, 2024, issued in counterpart EP Application No. 20951389.4, (8 pages).

\* cited by examiner

CONTROL DEVICE FOR APPLYING A POWER CONVERSION DEVICE AND POWER CONVERSION SYSTEM TO CONTROL AN AMPLITUDE AND A FREQUENCY OF A VOLTAGE

FIELD

The present disclosure relates to a control device for a power conversion device and a power conversion system.

BACKGROUND

PTL 1 discloses a power conversion system. According to the power conversion system, it is possible to transmit operation control information without laying a dedicated signal line in a case where a plurality of power converters connected in parallel are operated with a common control device.

CITATION LIST

Patent Literature

[PTL 1] JP H10-201105 A

SUMMARY

Technical Problem

However, the power conversion system disclosed in PTL 1 requires a common control device for a plurality of power converters. This makes the power conversion system complicated.

The present disclosure has been made to solve the above-described problem. An object of the present disclosure is to provide a control device for a power conversion device and a power conversion system which enable power to be appropriately supplied from a plurality of power converters to a load without the need of a common control device for the plurality of power converters in a state where the plurality of power converters are connected in parallel.

Solution to Problem

A control device for a power conversion device according to the present disclosure includes a voltage recognizing unit configured to detect a voltage at a linkage point of a plurality of power converters in a case where the plurality of power converters which convert DC power from a DC power supply into AC power are connected in parallel to a load, and a control unit configured to control an amplitude and a frequency of a voltage to be output by a power converter to be controlled on the basis of active power and reactive power output by the power converter to be controlled in a case where the power converter to be controlled is caused to perform autonomous operation as a voltage source in a state where the plurality of power converters are connected in parallel, and control active power and reactive power to be output by the power converter to be controlled so as to compensate for excess or deficiency of active power and reactive power at the linkage point on the basis of an amplitude and a frequency of the voltage detected by the voltage recognizing unit in a case where the power converter to be controlled is caused to perform linkage operation as a current source in a state where the plurality of power converters are connected in parallel.

A power conversion system according to the present disclosure includes a plurality of power converters connected in parallel to a load and configured to convert DC power from a DC power supply into AC power, and a voltage detector configured to detect a voltage at a linkage point of the plurality of power converters, part of the plurality of power converters performing autonomous operation as a voltage source, an amplitude and a frequency of a voltage to be output by the part of the plurality of power converters being controlled on the basis of active power and reactive power output by the part of the plurality of power converters, the other of the plurality of power converters performing linkage operation as a current source, active power and reactive power to be output by the other of the plurality of power converters being controlled so as to compensate for excess or deficiency of active power and reactive power at the linkage point on the basis of an amplitude and a frequency of the voltage detected by the voltage detector.

Advantageous Effects of Invention

According to the present disclosure, it is possible to appropriately supply power from a plurality of power converters to a load without the need of a common control device for the plurality of power converters in a state where the plurality of power converters are connected in parallel.

DESCRIPTION OF EMBODIMENTS

Figure 1:
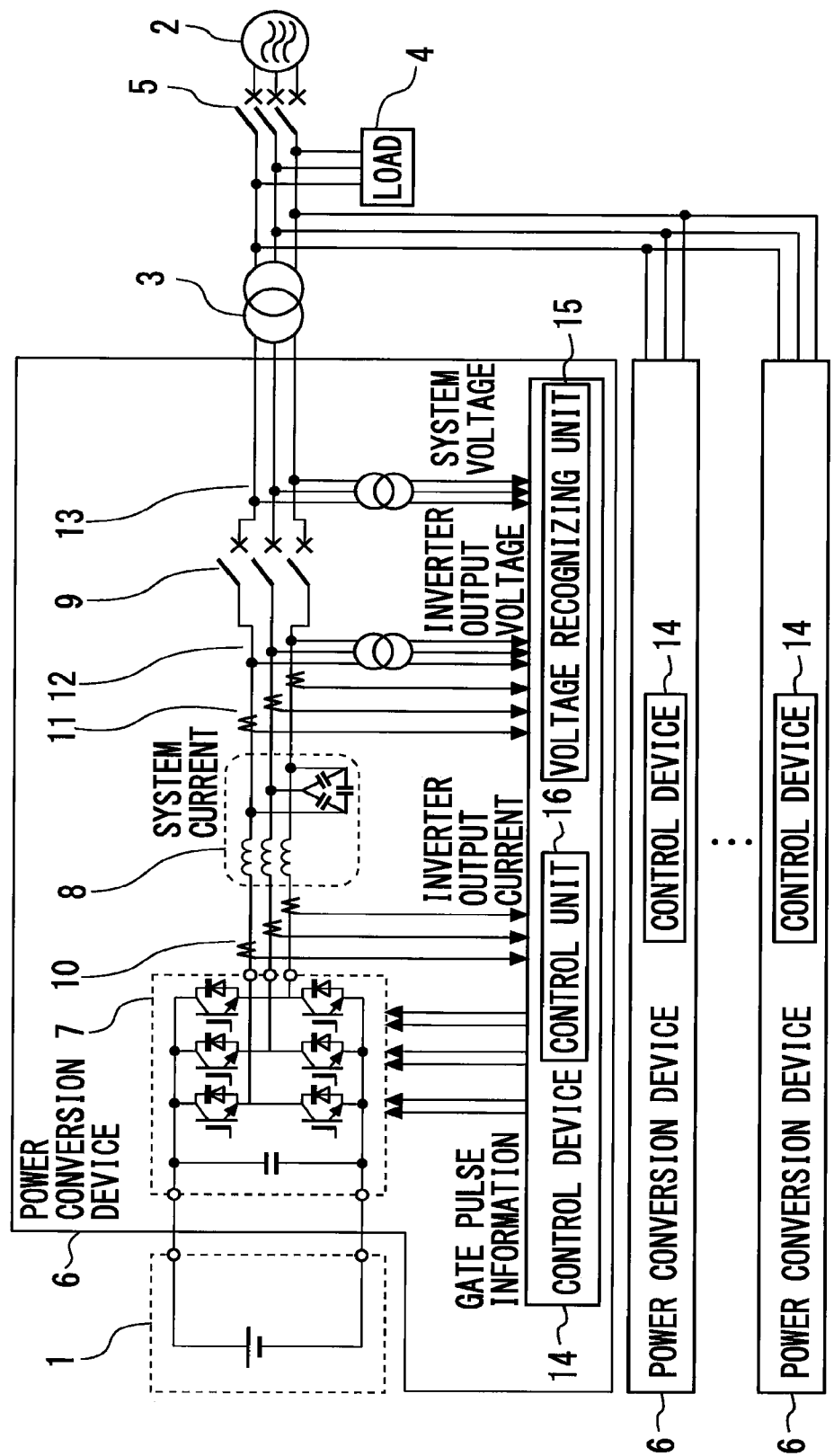
FIG. 1 is a configuration diagram of a power conversion system in Embodiment 1.

Embodiments will be described in accordance with the accompanying drawings. Note that the same reference numerals will be assigned to the same or corresponding portions in the respective drawings. Repetitive descriptions of the portions will be simplified or omitted as appropriate.

Embodiment 1

FIG. 1 is a configuration diagram of a power conversion system in Embodiment 1.

In FIG. 1, each of a plurality of DC power supplies 1 is provided so as to be able to output DC power. For example, each of the plurality of DC power supplies 1 is a wind power generation device. For example, each of the plurality of DC power supplies 1 is a photovoltaic device. For example, each of the plurality of DC power supplies 1 is an electric storage device. A system 2 is operated by an electric power company, or the like. The system 2 is provided so as to be able to output AC power. A voltage transforming device 3 is connected between the DC power supply 1 and the system 2. A load 4 is provided between the system 2 and the voltage transforming device 3. A switching device 5 is connected between the system 2 and the load 4.

A plurality of power conversion devices 6 are provided so as to respectively correspond to the plurality of DC power supplies 1. Each of the plurality of power conversion devices 6 is connected between the corresponding DC power supply 1 and the voltage transforming device 3. The plurality of power conversion devices 6 are connected in parallel to the load 4. For example, the power conversion device 6 includes a power converter 7, a harmonic filter 8, a switch 9, a first current detector 10, a second current detector 11, a first voltage detector 12, a second voltage detector 13, and a control device 14.

The power converter 7 is provided so as to be able to convert DC power from the DC power supply 1 into AC power. For example, the power converter 7 is provided so as to be able to convert DC power into three-phase AC power. The harmonic filter 8 is provided so as to be able to absorb harmonics of the AC power from the power converter 7. The switch 9 is provided so as to be able to open and close a wiring between a transformer and the harmonic filter 8.

The first current detector 10 is provided so as to be able to detect a current flowing between the power converter 7 and the harmonic filter 8 as an inverter output current. The second current detector 11 is provided so as to be able to detect a current flowing between the harmonic filter 8 and the switch 9 as a system 2 current. The first voltage detector 12 is provided so as to be able to detect a voltage between the harmonic filter 8 and the switch 9 as an inverter voltage.

The second voltage detector 13 is provided so as to be able to detect a voltage between the transformer and the switch 9 as a system voltage at a linkage point.

The control device 14 controls operation of the power converter 7 on the basis of the first current detector 10, the second current detector 11, the first voltage detector 12 and the second voltage detector 13. The control device 14 controls operation of the power converter 7 by outputting gate pulse information. For example, the control device 14 includes a voltage recognizing unit 15 and a control unit 16.

The voltage recognizing unit 15 recognizes a value of the voltage detected by the second voltage detector 13. The control unit 16 controls the power converter 7 on the basis of the voltage recognized by the voltage recognizing unit 15.

For example, when the switching device 5 opens upon power outage of the system 2, part of the plurality of power converters 7 functions as a voltage source. The other of the plurality of power converters 7 functions as a current source.

In this event, the control unit 16 in the control device 14 controls an amplitude and a frequency of a voltage to be output by the power converter 7 to be controlled on the basis of active power and reactive power output by the power converter 7 to be controlled in a case where the power converter 7 to be controlled is caused to perform autonomous operation as a voltage source. For example, the control unit 16 controls active power and reactive power to be output by the power converter 7 to be controlled so as to compensate for excess or deficiency of active power and reactive power at a linkage point on the basis of an amplitude and a frequency of the voltage detected by the voltage recognizing unit 15 in a case where the power converter 7 to be controlled is caused to perform linkage operation as a current source.

A method in a case where the power converter 7 is controlled as a voltage source will be described next using FIG. 2.

Figure 2:
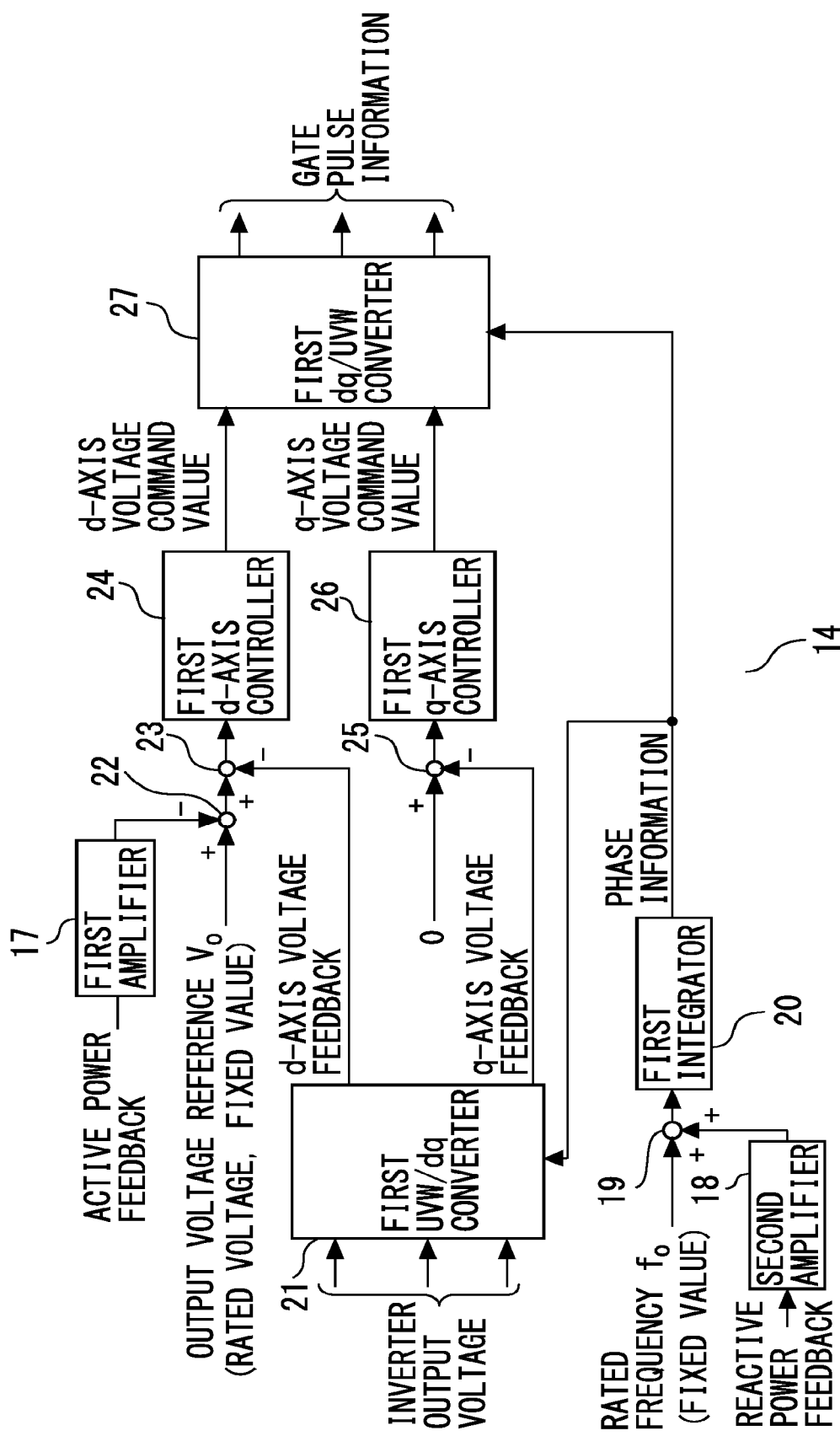
FIG. 2 illustrates an autonomous operation control block as a voltage source by a control device for a power conversion device of the power conversion system in Embodiment 1.

FIG. 2 illustrates an autonomous operation control block as a voltage source by the control device for the power conversion device of the power conversion system in Embodiment 1.

As illustrated in FIG. 2, the control device 14 includes a first amplifier 17, a second amplifier 18, a first adder 19, a first integrator 20, a first UVW/dq converter 21, a first subtractor 22, a second subtractor 23, a first d-axis voltage controller 24, a third subtractor 25, a first q-axis voltage controller 26, and a first dq/UVW converter 27.

The first amplifier 17 accepts input of information regarding a value of active power feedback. The first amplifier 17 outputs information regarding a value obtained by multiplying the active power feedback by a gain k1.

The second amplifier 18 accepts input of information regarding a value of reactive power feedback. The second amplifier 18 outputs information regarding a value obtained by multiplying the reactive power feedback by a gain k2.

The first adder 19 accepts input of information regarding a value (fixed value) of a rated frequency $f_0$. The first adder 19 accepts input of the information regarding the output value of the second amplifier 18. The first adder 19 outputs information regarding a value obtained by adding the value of the rated frequency $f_0$ and the output value of the second amplifier 18.

The first integrator 20 accepts input of the information regarding the output value of the first adder 19. The first integrator 20 outputs phase information based on the output value of the first adder 19.

The first UVW/dq converter 21 accepts input of information regarding a value of an inverter output voltage. The first UVW/dq converter 21 accepts input of the phase information from the first integrator 20. The first UVW/dq converter 21 outputs information regarding a value of d-axis current feedback and a value of q-axis voltage feedback based on the value of the inverter output voltage and the phase information.

The first subtractor 22 accepts input of information regarding a value (a rated voltage, a fixed value) of an output voltage reference $V_0$. The first subtractor 22 accepts input of the information regarding the output value of the first amplifier 17. A first subtraction value outputs information regarding a value obtained by subtracting the output value of the first amplifier 17 from the value of the output voltage reference $V_0$.

The second subtractor 23 accepts input of information regarding a value of d-axis voltage feedback from the first UVW/dq converter 21. The second subtractor 23 accepts input of the information regarding the output value of the first subtractor 22. The second subtractor 23 outputs information regarding a value obtained by subtracting the value of the d-axis voltage feedback from the output value of the first subtractor 22.

The first d-axis voltage controller 24 accepts input of the information regarding the output value of the second subtractor 23. The first d-axis voltage controller 24 outputs information regarding a d-axis voltage command value based on the output value of the second subtractor 23.

The third subtractor 25 accepts input of information regarding a value 0. The third subtractor 25 accepts input of information of a value of q-axis voltage feedback from the first UVW/dq converter 21. The third subtractor 25 outputs information regarding a value obtained by subtracting the value of the q-axis voltage feedback from the value 0.

The first q-axis voltage controller 26 accepts input of the information regarding the output value of the third subtractor 25. The first q-axis voltage controller 26 outputs information regarding a q-axis voltage command value based on the output value of the third subtractor 25.

The first dq/UVW converter 27 accepts input of information regarding the d-axis voltage command value from the first d-axis voltage controller 24. The first dq/UVW converter 27 accepts input of information regarding the q-axis voltage command value from the first q-axis voltage controller 26. The first dq/UVW converter 27 accepts input of the phase information from the first integrator 20. The first dq/UVW converter 27 generates a three-phase voltage command value based on the d-axis voltage command value and the q-axis voltage command value and transmits the three-phase voltage command value to a gate pulse generation circuit.

A method in a case where the power converter 7 is controlled as a current source will be described next using FIG. 3.

Figure 3:
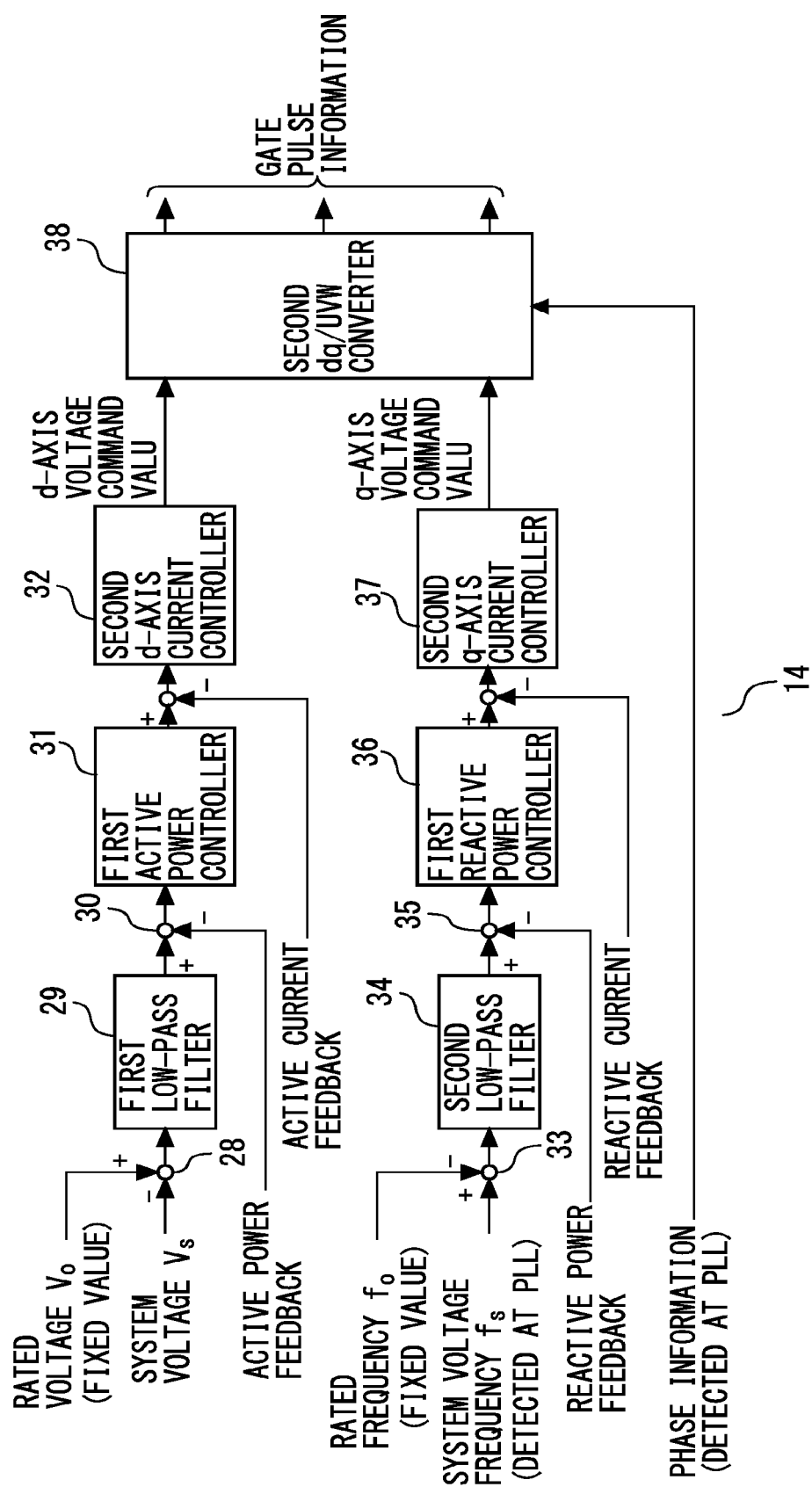
FIG. 3 is a linkage operation control block as a current source by the control device for the power conversion device of the power conversion system in Embodiment 1.

FIG. 3 illustrates a linkage operation control block as a current source by the control device for the power conversion device of the power conversion system in Embodiment 1.

As illustrated in FIG. 3, the control device 14 includes a fourth subtractor 28, a first low-pass filter 29, a fifth subtractor 30, a first active power controller 31. a second d-axis current controller 32, a sixth subtractor 33, a second low-pass filter 34, a seventh subtractor 35, a first reactive power controller 36, a second q-axis current controller 37, and a second dq/UVW converter 38.

The fourth subtractor 28 accepts input of information regarding a value (fixed value) of a rated voltage $V_o$. The fourth subtractor 28 accepts input of information regarding a value of a system voltage $V_s$. The fourth subtractor 28 outputs information regarding a value obtained by subtracting the value of the system voltage $V_s$ from the value of the rated voltage $V_0$.

The first low-pass filter 29 accepts input of the information regarding the output value of the fourth subtractor 28. The first low-pass filter 29 outputs information regarding a value obtained by multiplying a value corresponding to a low frequency band among the output value of the fourth subtractor 28 by a gain k3.

The fifth subtractor 30 accepts input of the information regarding the output value of the first low-pass filter 29. The fifth subtractor 30 accepts input of information regarding a value of active power feedback. The fifth subtractor 30 outputs information regarding a value obtained by subtracting the value of the active power feedback from the output value of the first low-pass filter 29.

The first active power controller 31 accepts input of the information regarding the output value of the fifth subtractor 30. The first active power controller 31 outputs information regarding an active current reference based on the output value of the fifth subtractor 30.

The second d-axis current controller 32 accepts input of the information regarding a value obtained by subtracting the value of the active power feedback from the active current reference from the first active power controller 31. The second d-axis current controller 32 outputs information regarding a d-axis voltage command value based on the active current reference.

The sixth subtractor 33 accepts input of information regarding a value (fixed value) of a system frequency $f_s$ detected by a PLL. The sixth subtractor 33 accepts input of information regarding a value of a rated frequency $f_0$. The sixth subtractor 33 outputs information regarding a value obtained by subtracting the value of the rated frequency $f_0$ from the value of the system frequency $f_s$.

The second low-pass filter 34 accepts input of the information regarding the output value of the sixth subtractor 33. The second low-pass filter 34 outputs information regarding a value obtained by multiplying a value corresponding to a low frequency band among the output value of the sixth subtractor 33 by a gain k4.

The seventh subtractor 35 accepts input of the information regarding the output value of the second low-pass filter 34. The seventh subtractor 35 accepts input of information regarding a value of reactive power feedback. The seventh subtractor 35 outputs information regarding a value obtained by subtracting the value of the reactive power feedback from the output value of the second low-pass filter 34.

The first reactive power controller 36 accepts input of the information regarding the output value of the seventh subtractor 35. The first reactive power controller 36 outputs information regarding a reactive current reference based on the output value of the seventh subtractor 35.

The second q-axis current controller 37 accepts input of the information regarding a value obtained by subtracting the value of the reactive power feedback from the reactive power reference from the first reactive power controller 36. The second q-axis current controller 37 outputs information regarding a q-axis voltage command value based on the reactive current reference.

The second dq/UVW converter 38 accepts input of the information regarding the d-axis voltage command value from the second d-axis current controller 32. The second dq/UVW converter 38 accepts input of the information regarding the q-axis voltage command value from the second q-axis current controller 37. The second dq/UVW converter 38 accepts input of phase information detected by the PLL. The second dq/UVW converter 38 generates a three-phase voltage command value based on the d-axis voltage command value, the q-axis voltage command value and the phase information, and transmits the three-phase voltage command value to the gate pulse generation circuit.

A method for determining an amplitude of an output voltage in a case where the power converter 7 is controlled as a voltage source will be described next using FIG. 4. The processing in this case is performed at the control unit 16 in the control device 14.

Figure 4:
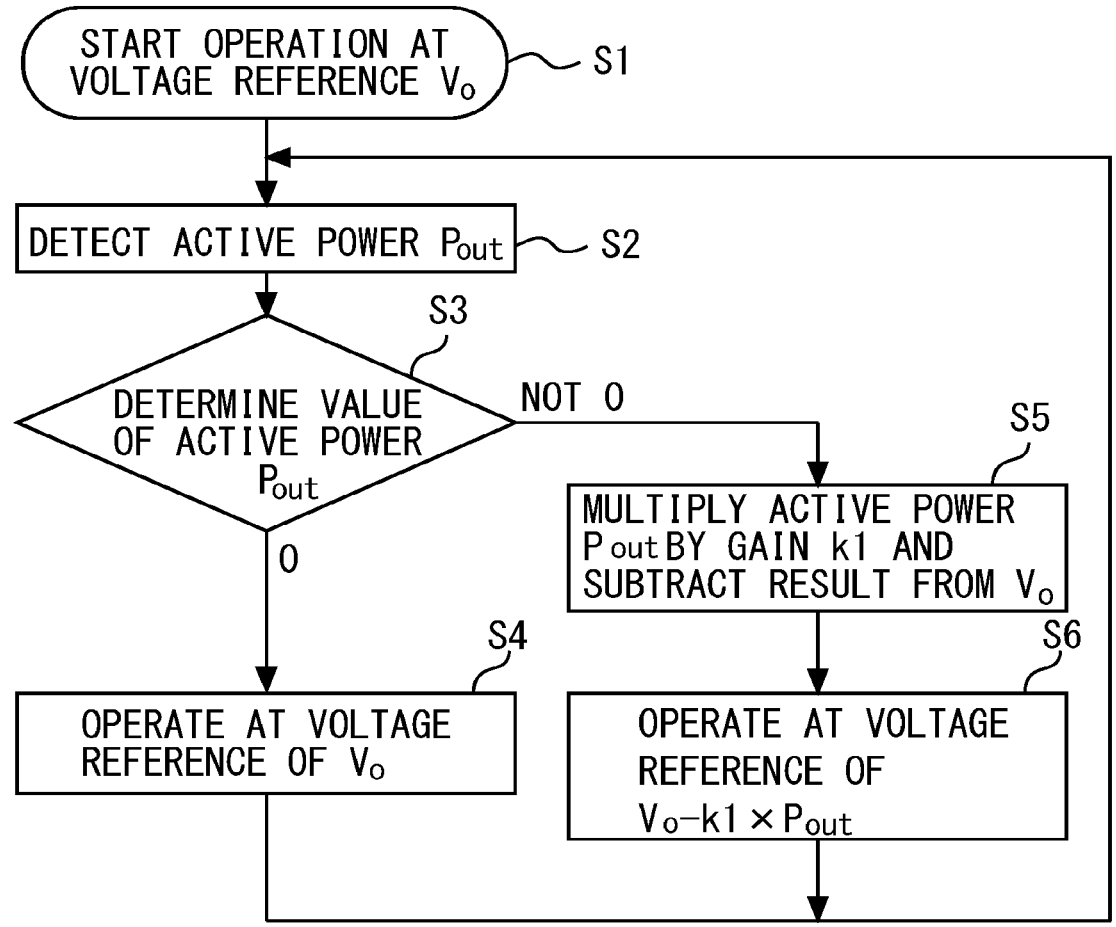
FIG. 4 is a flowchart for explaining a method for determining an amplitude of an output voltage as a voltage source by the control device for the power conversion device of the power conversion system in Embodiment 1.

FIG. 4 is a flowchart for explaining the method for determining an amplitude of an output voltage as a voltage source by the control device for the power conversion device of the power conversion system in Embodiment 1.

In step S1, the control device 14 starts operation at the voltage reference $V_0$. The control device 14 then performs operation in step S2. In step S2, the control device 14 detects active power $P_{out}$. The control device 14 then performs operation in step S3. In step S3, the control device 14 determines a value of the active power $P_{out}$.

In a case where a value of the active power $P_{out}$ is 0 in step S3, the control device 14 performs operation in step S4. In step S4, the control device 14 operates at a voltage reference of $V_0$. The control device 14 then performs operation in step S2.

In a case where the value of the active power $P_{out}$ is not 0 in step S3, the control device 14 performs operation in step S5. In step S5, the control device 14 multiplies the active power $P_{out}$ by the gain k1 and subtracts the result from $V_0$. The control device 14 then performs operation in step S6. In step S6, the control device 14 operates at a voltage reference of $V_0 - k1 \times P_{out}$. The control device 14 then performs operation in step S2.

A method for determining an amplitude of an operating frequency in a case where the power converter 7 is controlled as a voltage source will be described next using FIG. 5. The processing in this case is performed at the control unit 16 in the control device 14.

Figure 5:
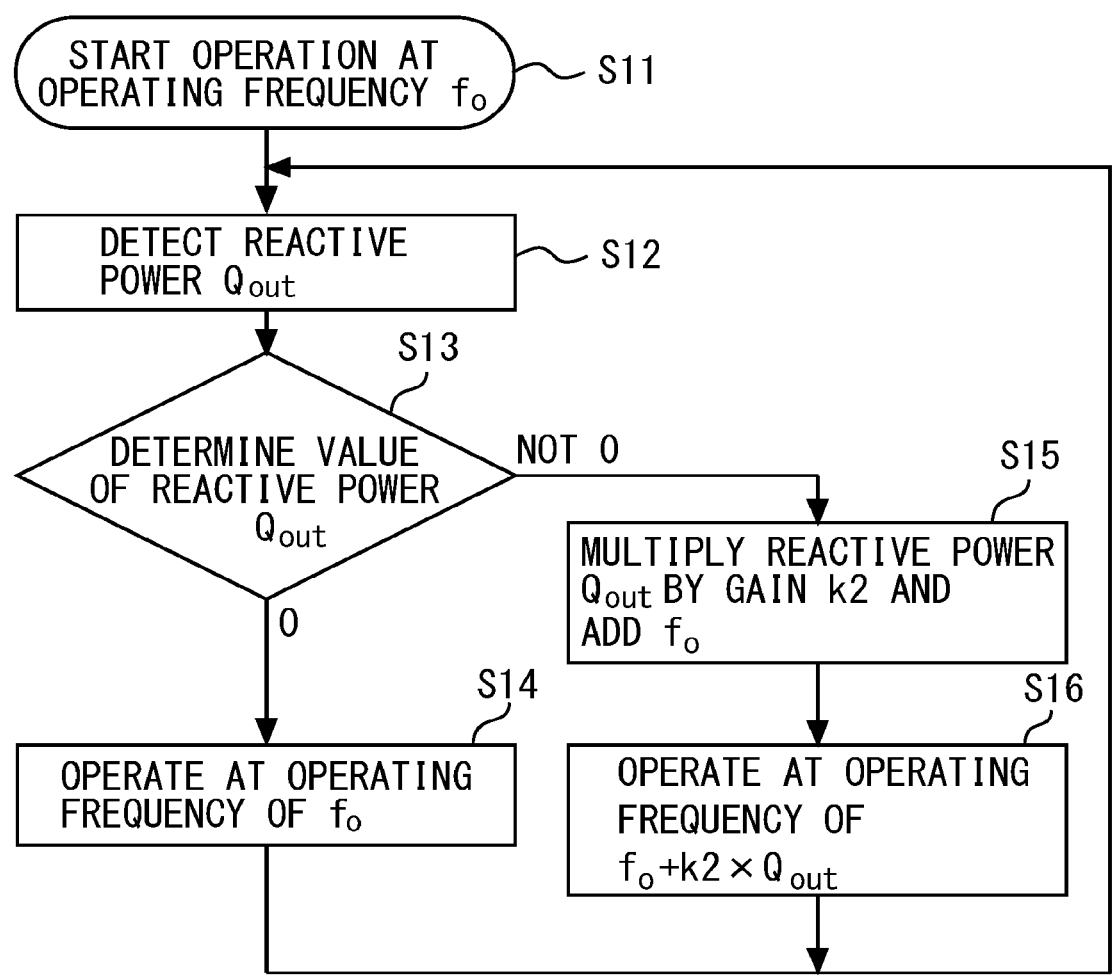
FIG. 5 is a flowchart for explaining a method for determining an operating frequency as a voltage source by the control device for the power conversion device of the power conversion system in Embodiment 1.

FIG. 5 is a flowchart for explaining the method for determining an operating frequency as a voltage source by the control device for the power conversion device of the power conversion system in Embodiment 1.

In step S11, the control device 14 starts operation at an operating frequency $f_0$. The control device 14 then performs operation in step S12. In step S12, the control device 14 detects reactive power $Q_{out}$. The control device 14 then performs operation in step S13. In step S13, the control device 14 determines a value of the reactive power $Q_{out}$.

In a case where the value of the reactive power $Q_{out}$ is 0 in step S13, the control device 14 performs operation in step S14. In step S14, the control device 14 operates at an operating frequency of $f_0$. The control device 14 then performs operation in step S12.

In a case where the value of the reactive power $Q_{out}$ is not 0 in step S13, the control device 14 performs operation in step S15. In step S15, the control device 14 multiplies the reactive power $Q_{out}$ by the gain k2 and adds the result to $f_0$. The control device 14 then performs operation in step S16. In step S16, the control device 14 operates at an operating frequency of $f_0 + k2 \times Q_{out}$. The control device 14 then performs operation in step S12.

A method for determining output active power in a case where the power converter 7 is controlled as a current source will be described next using FIG. 6. The processing in this case is performed at the control unit 16 in the control device 14.

Figure 6:
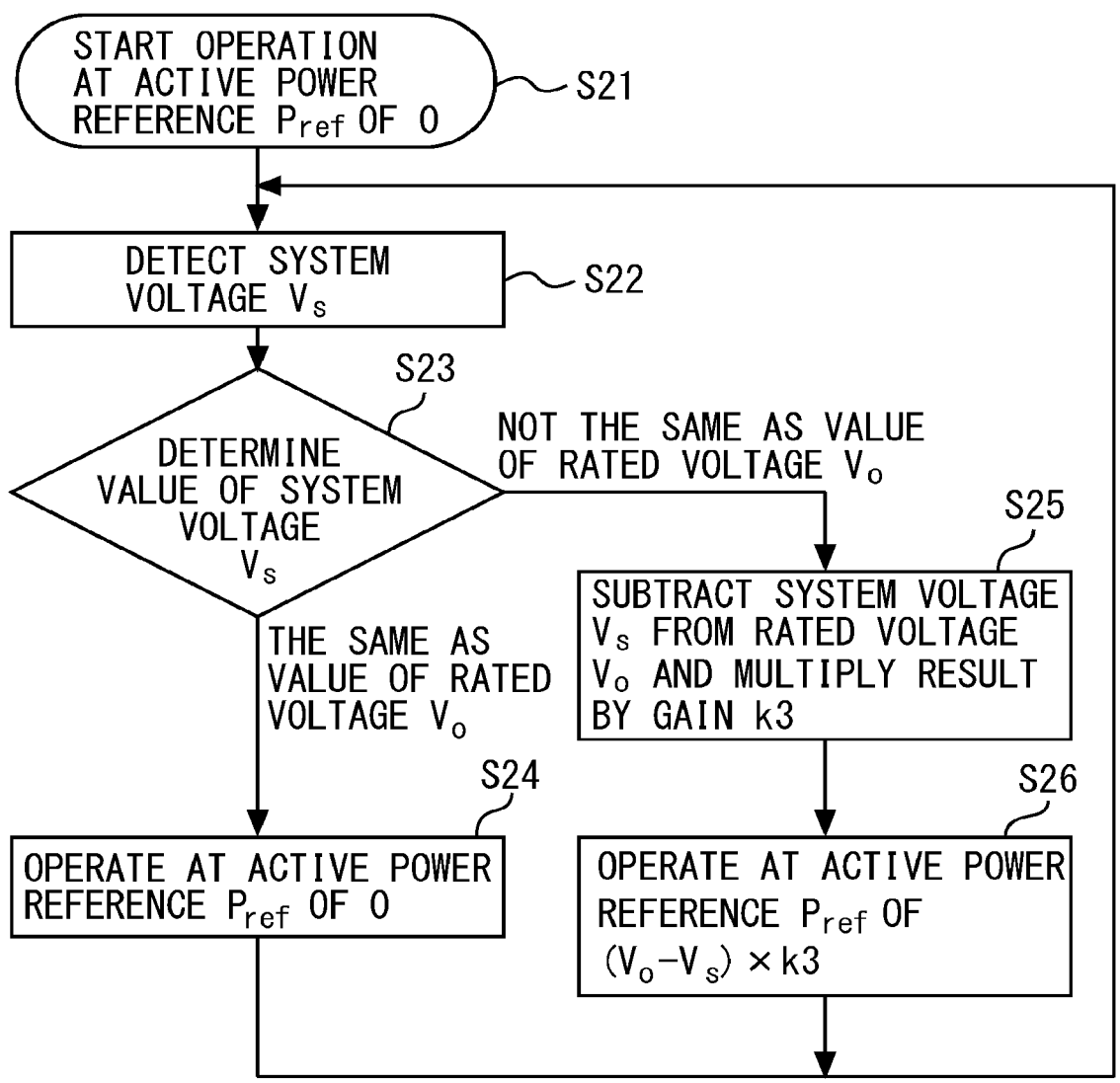
FIG. 6 is a flowchart for explaining a method for determining output active power as a current source by the control device for the power conversion device of the power conversion system in Embodiment 1.

FIG. 6 is a flowchart for explaining the method for determining output active power as a current source by the control device for the power conversion device of the power conversion system in Embodiment 1.

In step S21, the control device 14 starts operation at an active power reference $P_{ref}$ of 0. The control device 14 then performs operation in step S22. In step S22, the control device 14 detects a system voltage $V_s$. The control device 14 then performs operation in step S23. In step S23, the control device 14 determines a value of the system voltage $V_s$.

In a case where the value of the system voltage $V_s$ is the same as the value of the rated voltage $V_0$ in step S23, the control device 14 performs operation in step S24. In step S24, the control device 14 operates at the active power reference $P_{ref}$ of 0. The control device 14 then performs operation in step S22.

In a case where the value of the system voltage $V_s$ is not the same as the value of the rated voltage $V_0$ in step S23, the control device 14 performs operation in step S25. In step S25, the control device 14 subtracts the system voltage $V_s$ from the rated voltage $V_0$ and multiplies the result by the gain k3. The control device 14 then performs operation in step S26. In step S26, the control device 14 operates at the active power reference $P_{ref}$ of $(V_0 - V_s) \times k3$. The control device 14 then performs operation in step S22.

A method for determining output reactive power in a case where the power converter 7 is controlled as a current source will be described next using FIG. 7. The processing in this case is performed at the control unit 16 in the control device 14.

Figure 7:
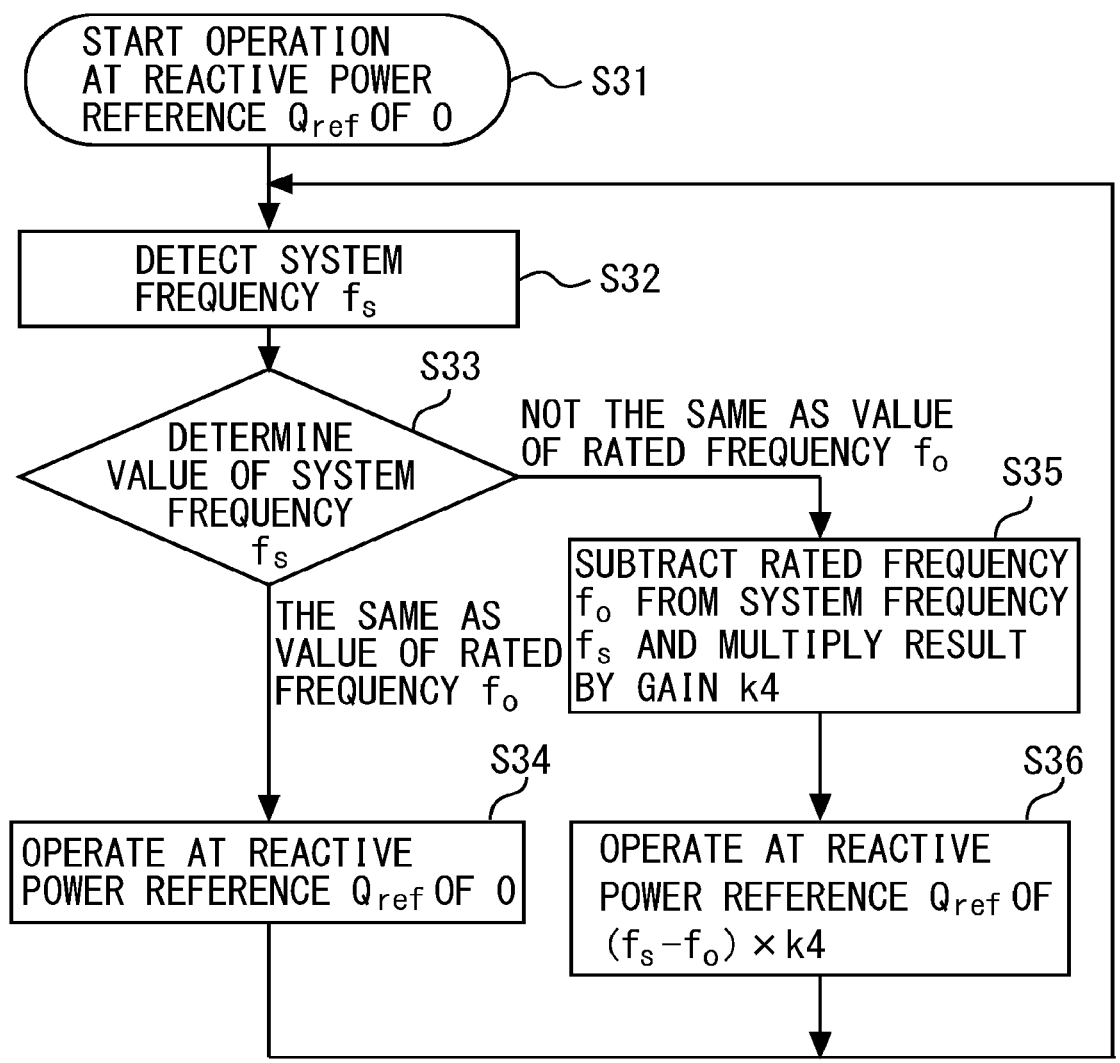
FIG. 7 is a flowchart for explaining a method for determining output reactive power as a current source by the control device for the power conversion device of the power conversion system in Embodiment 1.

FIG. 7 is a flowchart for explaining the method for determining output reactive power as a current source by the control device for the power conversion device of the power conversion system in Embodiment 1.

In step S31, the control device 14 starts operation at a reactive power reference $Q_{ref}$ of 0. The control device 14 then performs operation in step S32. In step S32, the control device 14 detects a system frequency $f_s$. The control device 14 then performs operation in step S33. In step S33, the control device 14 determines a value of the system frequency $f_s$.

In a case where the value of the system frequency $f_s$ is the same as the value of the rated frequency $f_0$ in step S33, the control device 14 performs operation in step S34. In step S34, the control device 14 operates at the reactive power reference $Q_{ref}$ of 0. The control device 14 then performs operation in step S32.

In a case where the value of the system frequency $f_s$ is not the same as the value of the rated frequency $f_0$ in step S33, the control device 14 performs operation in step S35. In step S35, the control device 14 subtracts the rated frequency $f_0$ from the system frequency $f_s$ and multiplies the result by the gain k4. The control device 14 then performs operation in step S36. In step S36, the control device 14 operates at the reactive power reference $Q_{ref}$ of $(f_s - f_0) \times k4$. The control device 14 then performs operation in step S22.

According to Embodiment 1 described above, in a case where the power converter 7 to be controlled is caused to perform autonomous operation as a voltage source in a state where the plurality of power converters 7 are connected in parallel, the control device 14 controls an amplitude and a frequency of a voltage to be output by the power converter 7 to be controlled on the basis of active power and reactive power output by the power converter 7 to be controlled. In a case where the power converter 7 to be controlled is caused to perform linkage operation as a current source in a state where the plurality of power converters 7 are connected in parallel, the control device 14 controls active power and reactive power to be output by the power converter 7 to be controlled so as to compensate for excess or deficiency of active power and reactive power at a linkage point on the basis of an amplitude and a frequency of a voltage at the linkage point of the plurality of power converters 7. Thus, in a state where a plurality of power converters are connected in parallel, it is possible to appropriately supply power from the plurality of power converters 7 to the load 4 without the need of a common control device for the plurality of power converters 7, exchange of information with the control device 14, and detection of power consumption at the load 4.

Specifically, in a case where the power converter 7 to be controlled is caused to perform autonomous operation as a voltage source in a state where the plurality of power converters 7 are connected in parallel, the control device 14 controls an amplitude of a voltage to be output by the power converter 7 to be controlled on the basis of active power output by the power converter 7 to be controlled and controls a frequency of a voltage to be output by the power converter 7 to be controlled on the basis of reactive power output by the power converter 7 to be controlled. In a case where the power converter 7 to be controlled is caused to perform linkage operation as a current source in a state where the plurality of power converters 7 are connected in parallel, the control device 14 controls active power to be output by the power converter 7 to be controlled on the basis of an amplitude of a voltage at a linkage point of the plurality of power converters 7 and controls reactive power to be output by the power converter 7 to be controlled on the basis of a frequency of the voltage at the linkage point of the plurality of power converters 7. It is therefore possible to appropriately supply power from the plurality of power converters 7 to the load 4 without the need of a common control device for a plurality of power converters and without the need of a common control device for the plurality of power converters 7.

An example of the control device 14 will be described next using FIG. 8.

Figure 8:
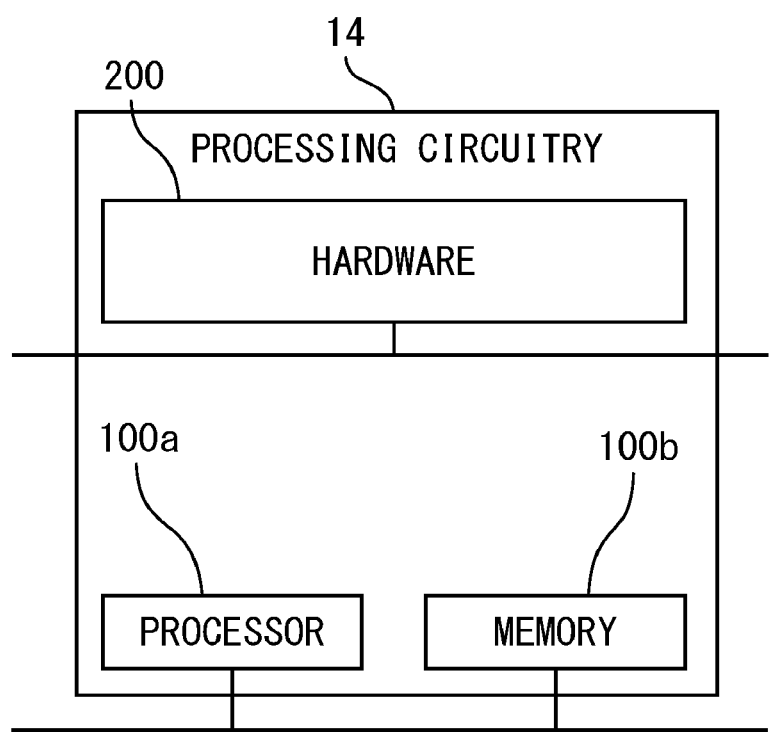
FIG. 8 is a hardware configuration diagram of the control device for the power conversion device of the power conversion system in Embodiment 1.

FIG. 8 is a hardware configuration diagram of the control device for the power conversion device of the power conversion system in Embodiment 1.

Respective functions of the control device 14 can be implemented with processing circuitry. For example, the processing circuitry includes at least one processor 100a, and at least one memory 100b. For example, the processing circuitry includes at least one piece of dedicated hardware 200.

In a case where the processing circuitry includes at least one processor 100a and at least one memory 100b, respective functions of the control device 14 are implemented with software, firmware or combination of software and firmware. At least one of software and firmware is described as a program. At least one of software and firmware is stored in at least one memory 100b. At least one processor 100a implements respective functions of the control device 14 by reading out and executing the program stored in at least one memory 100b. At least one processor 100a is also referred to as a central processing unit, a processing device, an arithmetic device, a microprocessor, a microcomputer, or a DSP. For example, at least one memory 100b includes a non-volatile or a volatile semiconductor memory such as a RAM, a ROM, a flash memory, an EPROM and an EEPROM, a magnetic disk, a flexible disk, an optical disk, a compact disk, a mini disk, a DVD, and the like.

In a case where the processing circuitry includes at least one piece of dedicated hardware 200, the processing circuitry is implemented with, for example, a single circuit, a composite circuit, a programmed processor, a parallelly programmed processor, an ASIC, an FPGA or combination thereof. For example, each function of the control device 14 may be separately implemented with processing circuitry. For example, the respective functions of the control device 14 may be collectively implemented with processing circuitry.

Some of the respective functions of the control device 14 may be implemented with dedicated hardware 200 and the others may be implemented with software or firmware. For example, functions of the control unit 16 may be implemented with processing circuitry as the dedicated hardware 200, and functions other than the functions of the control unit 16 may be implemented by at least one processor 100a reading out and executing the program stored in at least one memory 100b.

In this manner, the processing circuitry implements the respective functions of the control device 14 with the hardware 200, software, firmware or combination thereof.

Embodiment 2

Figure 9:
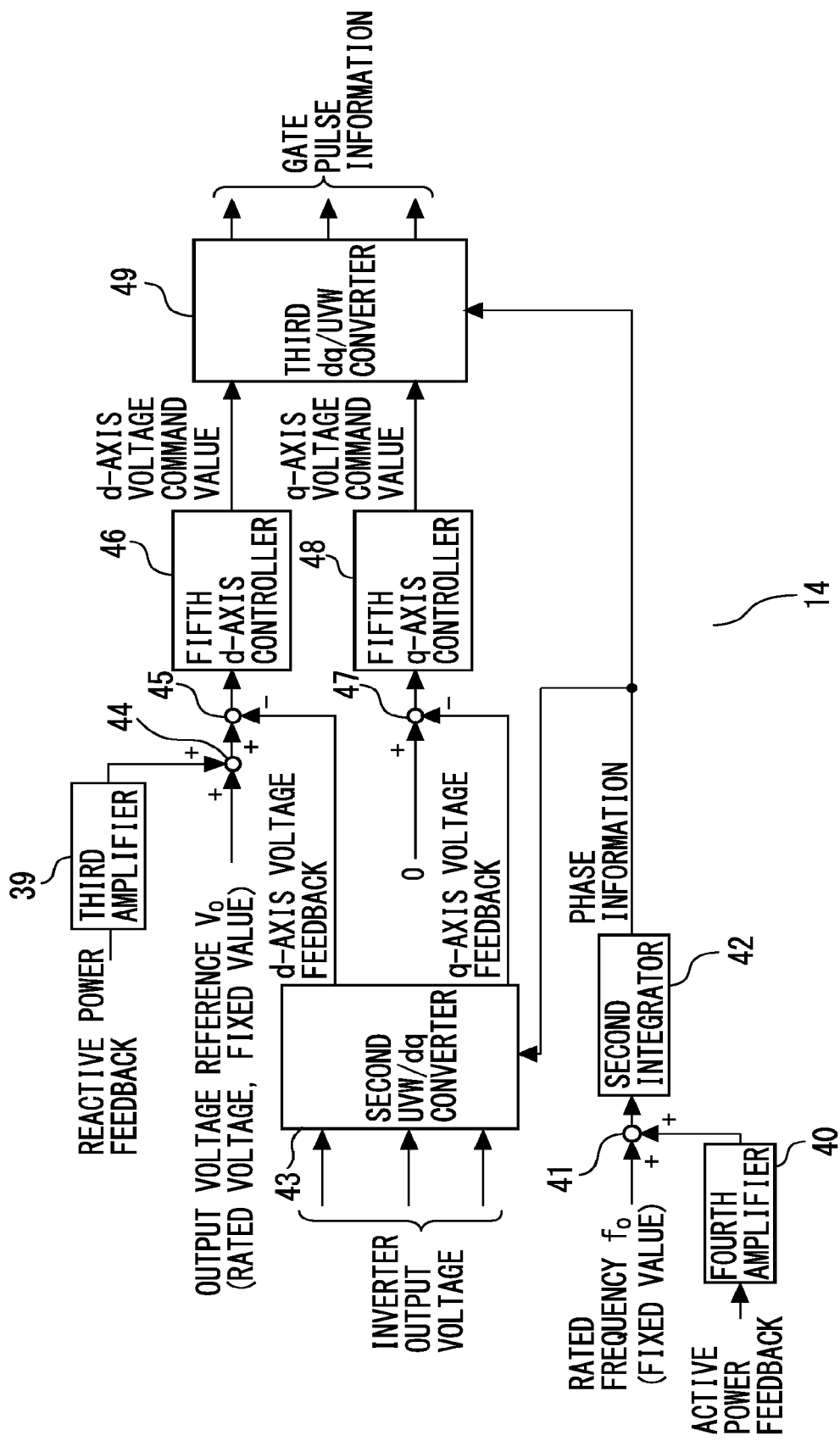
FIG. 9 illustrates an autonomous operation control block as a voltage source by a control device for a power conversion device of a power conversion system in Embodiment 2.
Figure 10:
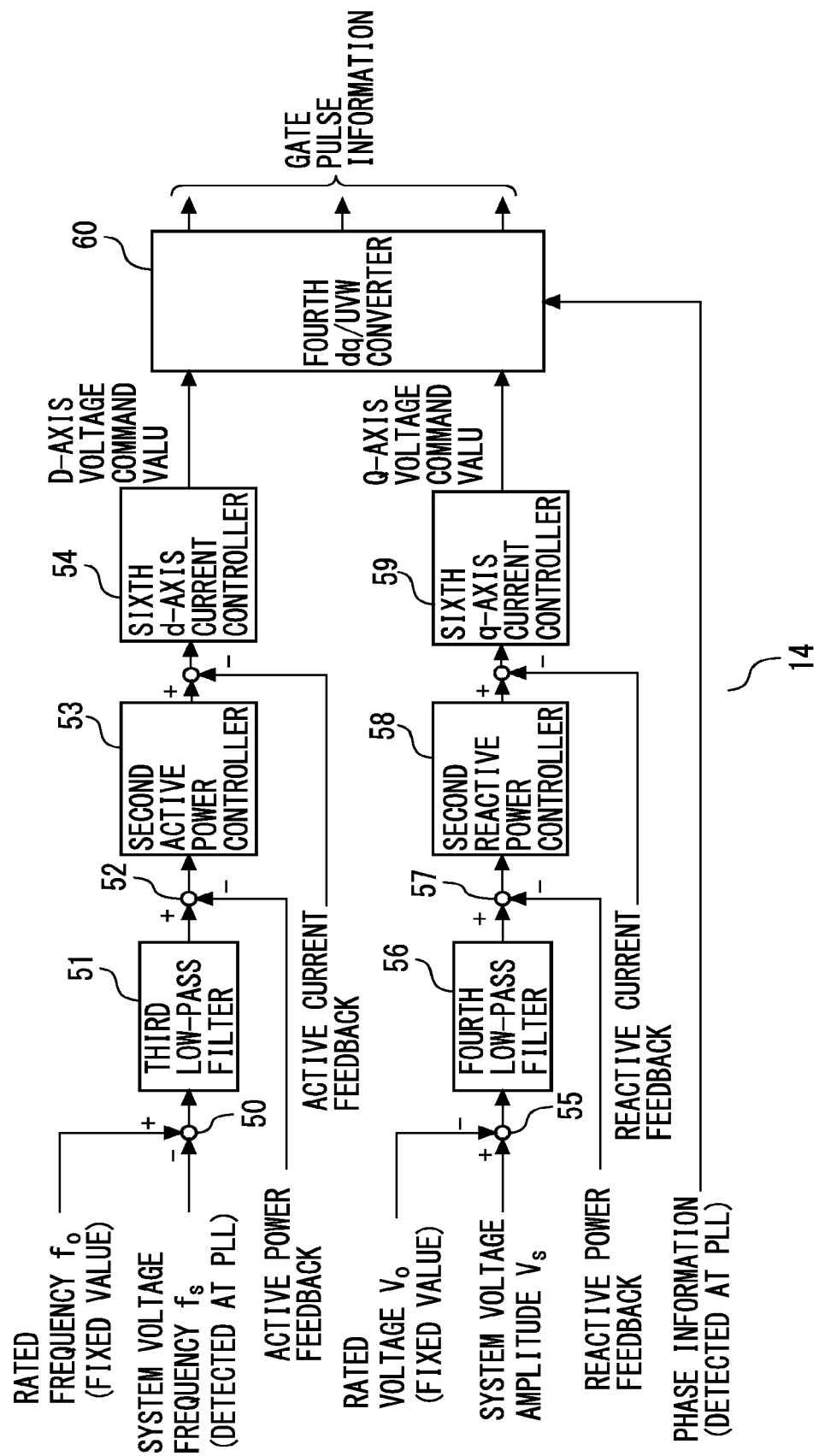
FIG. 10 illustrates a linkage operation control block as a current source by the control device for the power conversion device of the power conversion system in Embodiment 2.

FIG. 9 illustrates an autonomous operation control block as a voltage source by a control device for a power conversion device of a power conversion system in Embodiment 2. FIG. 10 illustrates a linkage operation control block as a current source by the control device for the power conversion device of the power conversion system in Embodiment 2. Note that the same reference numerals will be assigned to portions which are the same as or correspond to the portions in Embodiment 1. Description of the portions will be omitted.

FIG. 9 is a view for explaining a method in a case where the power converter 7 is controlled as a voltage source. As illustrated in FIG. 9, the control device 14 includes a third amplifier 39, a fourth amplifier 40, an eighth subtractor 41, a second integrator 42, a second UVW/dq converter 43, a second adder 44, a ninth subtractor 45, a fifth d-axis voltage controller 46, a tenth subtractor 47, a fifth q-axis voltage controller 48, and a third dq/UVW converter 49.

The third amplifier 39 accepts input of information regarding a value of reactive power feedback. The third amplifier 39 outputs information regarding a value obtained by multiplying the active power feedback by the gain k1.

The fourth amplifier 40 accepts input of information regarding a value of active power feedback. The fourth amplifier 40 outputs information regarding a value obtained by multiplying the active power feedback by the gain k2.

The eighth subtractor 41 accepts input of information regarding a value (fixed value) of a rated frequency $f_0$. The eighth subtractor 41 accepts input of the information regarding the output value of the fourth amplifier 40. The eighth subtractor 41 outputs information regarding a value obtained by subtracting the output value of the fourth amplifier 40 from the value of the rated frequency $f_0$.

The second integrator 42 accepts input of the information regarding the output value of the eighth subtractor 41. The second integrator 42 outputs phase information based on the output value of the eighth subtractor 41.

The second UVW/dq converter 43 accepts input of information regarding a value of an inverter output voltage. The second UVW/dq converter 43 accepts input of the phase information from the second integrator 42. The second UVW/dq converter 43 outputs information regarding a value of d-axis current feedback and a value of q-axis voltage feedback based on the information regarding the value of the inverter output voltage and the phase information.

The second adder 44 accepts input of the information regarding the output value of the third amplifier 39. The second adder 44 accepts input of information regarding a value (a rated voltage, a fixed value) of an output voltage reference $V_0$. The second adder 44 outputs information regarding a value obtained by adding the output value of the third amplifier 39 and the value of the output voltage reference $V_0$.

The ninth subtractor 45 accepts input of the information regarding the output value of the second adder 44. The ninth subtractor 45 accepts input of information regarding the value of the d-axis voltage feedback from the second UVW/dq converter 43. The ninth subtractor 45 outputs information regarding a value obtained by subtracting the value of the d-axis voltage feedback from the output value of the second adder 44.

The fifth d-axis voltage controller 46 accepts input of the information regarding the output value of the ninth subtractor 45. The fifth d-axis voltage controller 46 outputs information regarding a d-axis voltage command value based on the output value of the ninth subtractor 45.

The tenth subtractor 47 accepts input of information regarding a value 0. The tenth subtractor 47 accepts input of information regarding the value of the q-axis voltage feedback from the second UVW/dq converter 43. The tenth subtractor 47 outputs information regarding a value obtained by subtracting the value of the q-axis voltage feedback from the value 0.

The fifth q-axis voltage controller 48 accepts input of the information regarding the output value of the tenth subtractor 47. The fifth q-axis voltage controller 48 outputs information regarding a q-axis voltage command value based on the output value of the tenth subtractor 47.

The third dq/UVW converter 49 accepts input of the information regarding the d-axis voltage command value from the fifth d-axis voltage controller 46. The third dq/UVW converter 49 accepts input of the information regarding the q-axis voltage command value from the fifth q-axis voltage controller 48. The third dq/UVW converter 49 accepts input of the phase information from the second integrator 42. The third dq/UVW converter 49 generates a three-phase voltage command value based on the d-axis voltage command value, the q-axis voltage command value and the phase information and transmits the three-phase voltage command value to the gate pulse generation circuit.

FIG. 10 is a view for explaining a method in a case where the power converter 7 is controlled as a current source. As illustrated in FIG. 10, the control device 14 includes an eleventh subtractor 50, a third low-pass filter 51, a twelfth subtractor 52, a second active power controller 53, a sixth d-axis current controller 54, a thirteenth subtractor 55, a fourth low-pass filter 56, a fourteenth subtractor 57, a second reactive power controller 58, a sixth q-axis current controller 59, and a fourth dq/UVW converter 60.

The eleventh subtractor 50 accepts input of information regarding a value (fixed value) of a rated frequency $f_0$. The eleventh subtractor 50 accepts input of information regarding a value of a system frequency $f_s$ detected by the PLL. The eleventh subtractor 50 outputs information regarding a value obtained by subtracting the value of the system frequency $f_s$ from the value of the rated frequency $f_0$.

The third low-pass filter 51 accepts input of the information regarding the output value of the eleventh subtractor 50. The third low-pass filter 51 outputs information regarding a value obtained by multiplying a value corresponding to a low frequency band among the output value of the eleventh subtractor 50 by the gain k3.

The twelfth subtractor 52 accepts input of the information regarding the output value of the third low-pass filter 51. The twelfth subtractor 52 accepts input of information regarding a value of active power feedback. The twelfth subtractor 52 outputs information regarding a value obtained by subtracting the value of the active power feedback from the output value of the third low-pass filter 51.

The second active power controller accepts input of the information regarding the output value of the twelfth subtractor 52. The second active power controller outputs information regarding an active current reference based on the output value of the twelfth subtractor 52.

The sixth d-axis current controller 54 accepts input of the information regarding a value obtained by subtracting the value of the active power feedback from the active current reference from the second active power controller. The sixth d-axis current controller 54 outputs information regarding a d-axis voltage command value based on the active current reference.

The thirteenth subtractor 55 accepts input of information regarding a value of a system voltage $V_s$. The thirteenth subtractor 55 accepts input of information regarding a value (fixed value) of a rated voltage $V_0$. The thirteenth subtractor 55 outputs information regarding a value obtained by subtracting the value of the rated voltage $V_0$ from the value of the system voltage $V_s$.

The fourth low-pass filter 56 accepts input of the information regarding the output value of the thirteenth subtractor 55. The fourth low-pass filter 56 outputs information regarding a value obtained by multiplying a value corresponding to a low frequency band among the output value of the thirteenth subtractor 55 by the gain k4.

The fourteenth subtractor 57 accepts input of the information regarding the output value of the fourth low-pass filter 56. The fourteenth subtractor 57 accepts input of information regarding a value of reactive power feedback. The fourteenth subtractor 57 outputs information regarding a value obtained by subtracting the value of the reactive power feedback from the output value of the fourth low-pass filter 56.

The second reactive power controller 58 accepts input of the information regarding the output value of the fourteenth subtractor 57. The second reactive power controller 58 outputs information regarding a reactive current reference based on the output value of the fourteenth subtractor 57.

The sixth q-axis current controller 59 accepts input of the information regarding a value obtained by subtracting the value of the reactive power feedback from the reactive current reference from the second reactive power controller 58. The sixth q-axis current controller 59 outputs information regarding a q-axis voltage command value based on the reactive current reference.

The fourth dq/UVW converter 60 accepts input of the information regarding the d-axis voltage command value from the sixth d-axis current controller 54. The fourth dq/UVW converter 60 accepts input of the information regarding the q-axis voltage command value from the sixth q-axis current controller 59. The fourth dq/UVW converter 60 accepts input of phase information detected by the PLL. The fourth dq/UVW converter 60 generates a three-phase voltage command value based on the d-axis voltage command value, the q-axis voltage command value and the phase information and transmits the three-phase voltage command value to the gate pulse generation circuit.

A method for determining an amplitude of an output voltage in a case where the power converter 7 is controlled as a voltage source will be described next using FIG. 11. The processing in this case is performed at the control unit 16 in the control device 14.

Figure 11:
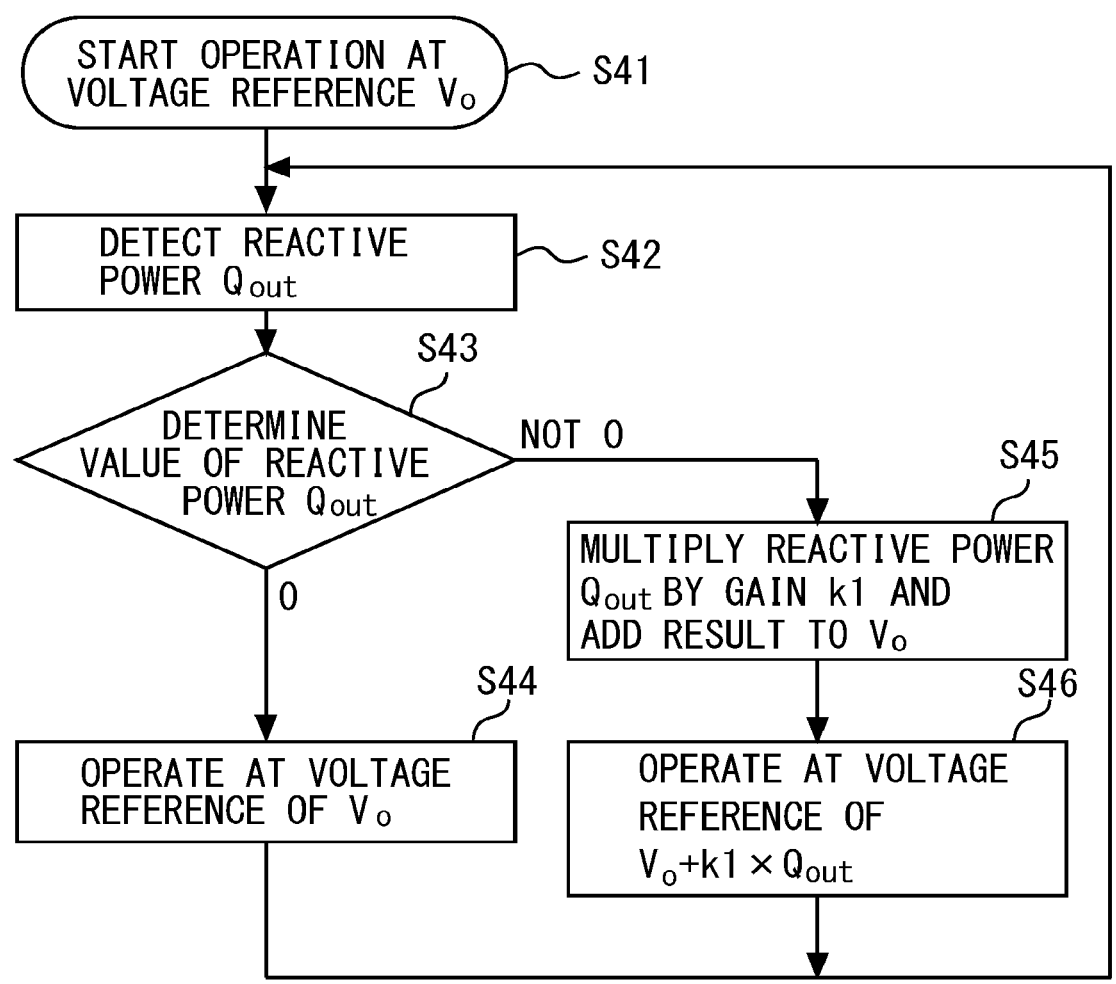
FIG. 11 is a flowchart for explaining a method for determining an amplitude of an output voltage as a voltage source by the control device for the power conversion device of the power conversion system in Embodiment 2.

FIG. 11 is a flowchart for explaining the method for determining an amplitude of an output voltage as a voltage source by the control device for the power conversion device of the power conversion system in Embodiment 2.

In step S41, the control device 14 starts operation at the voltage reference $V_0$. The control device 14 then performs operation in step S42. In step S42, the control device 14 detects reactive power $Q_{out}$. The control device 14 then performs operation in step S43. In step S43, the control device 14 determines a value of the reactive power $Q_{out}$.

In a case where the value of the reactive power $Q_{out}$ is 0 in step S43, the control device 14 performs operation in step S44. In step S44, the control device 14 operates at a voltage reference of $V_0$. The control device 14 then performs operation in step S42.

In a case where the value of the reactive power $Q_{out}$ is not 0 in step S43, the control device 14 performs operation in step S45. In step S45, the control device 14 multiplies the reactive power $Q_{out}$ by the gain k1 and adds the result to $V_0$. The control device 14 then performs operation in step S46. In step S46, the control device 14 operates at a voltage reference of $V_0+k1 \times Q_{out}$. The control device 14 then performs operation in step S42.

A method for determining an operating frequency in a case where the power converter 7 is controlled as a voltage source will be described next using FIG. 12. The processing in this case is performed at the control unit 16 in the control device 14.

Figure 12:
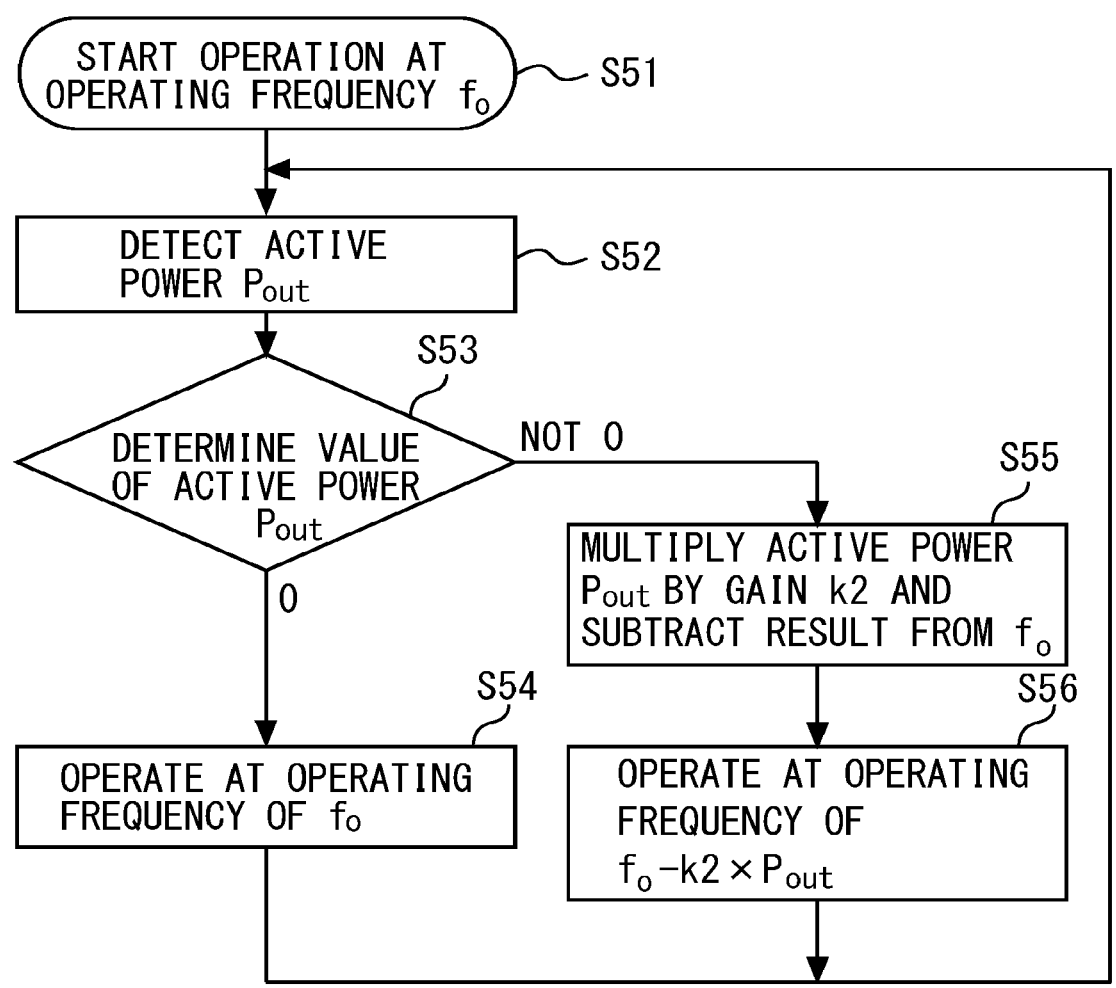
FIG. 12 is a flowchart for explaining a method for determining an operating frequency as a voltage source by the control device for the power conversion device of the power conversion system in Embodiment 2.

FIG. 12 is a flowchart for explaining the method for determining an operating frequency as a voltage source by the control device for the power conversion device of the power conversion system in Embodiment 2.

In step S51, the control device 14 starts operation at an operating frequency $f_0$. The control device 14 then performs operation in step S52. In step S52, the control device 14 detects active power $P_{out}$. The control device 14 then performs operation in step S53. In step S53, the control device 14 determines a value of the active power $P_{out}$.

In a case where the value of the active power $P_{out}$ is 0 in step S53, the control device 14 performs operation in step S54. In step S54, the control device 14 operates at the operating frequency of $f_0$. The control device 14 then performs operation in step S52.

In a case where the value of the active power $P_{out}$ is not 0 in step S53, the control device 14 performs operation in step S55. In step S55, the control device 14 multiplies the active power $P_{out}$ by the gain k2 and subtracts the result from $f_0$. The control device 14 then performs operation in step S56. In step S56, the control device 14 operates at the operating frequency of $f_0-k2 \times P_{out}$. The control device 14 then performs operation in step S52.

A method for determining output active power in a case where the power converter 7 is controlled as a current source will be described next using FIG. 13. The processing in this case is performed at the control unit 16 in the control device 14.

Figure 13:
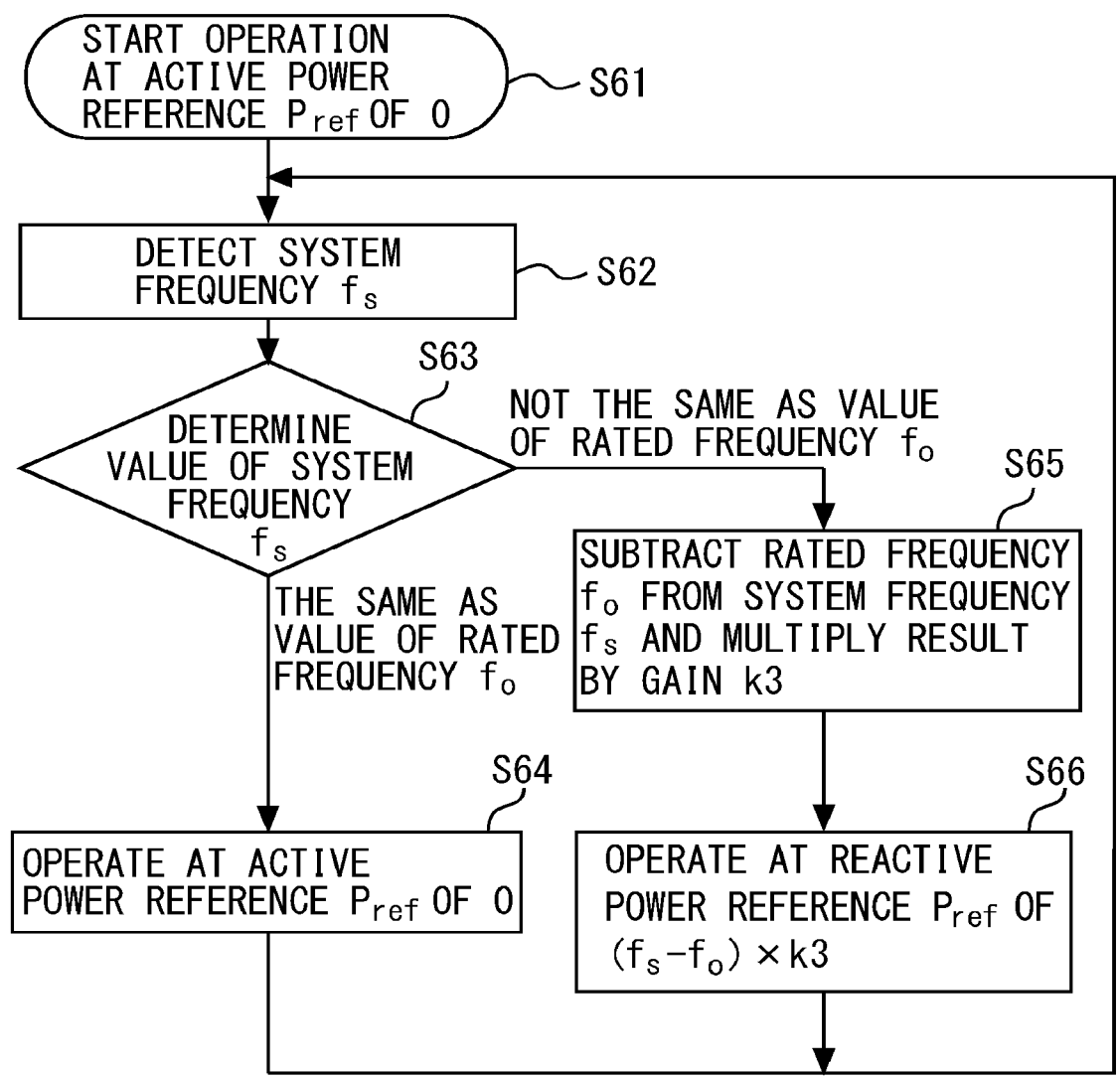
FIG. 13 is a flowchart for explaining a method for determining output active power as a current source by a control device 14 for a power conversion device 6 of the power conversion system in Embodiment 2.

FIG. 13 is a flowchart for explaining the method for determining output active power as a current source by the control device for the power conversion device of the power conversion system in Embodiment 2.

In step S61, the control device 14 starts operation at the active power reference $P_{ref}$ of 0. The control device 14 then performs operation in step S62. In step S62, the control device 14 detects a system frequency $f_s$. The control device 14 then performs operation in step S63. In step S63, the control device 14 determines a value of the system frequency $f_s$.

In a case where the value of the system frequency $f_s$ is the same as the value of the rated frequency $f_0$ in step S63, the control device 14 performs operation in step S64. In step S64, the control device 14 operates at the active power reference $P_{ref}$ of 0. The control device 14 then performs operation in step S62.

In a case where the value of the system frequency $f_s$ is not the same as the value of the rated frequency $f_0$ in step S63, the control device 14 performs operation in step S65. In step S65, the control device 14 subtracts the system frequency $f_s$ from the rated frequency $f_0$ and multiplies the result by the gain k3. The control device 14 then performs operation in step S66. In step S66, the control device 14 operates at the active power reference $P_{ref}$ of $(f_0-f_s) \times k3$. The control device 14 then performs operation in step S62.

A method for determining output reactive power in a case where the power converter 7 is controlled as a current source will be described next using FIG. 14. The processing in this case is performed at the control unit 16 in the control device 14.

Figure 14:
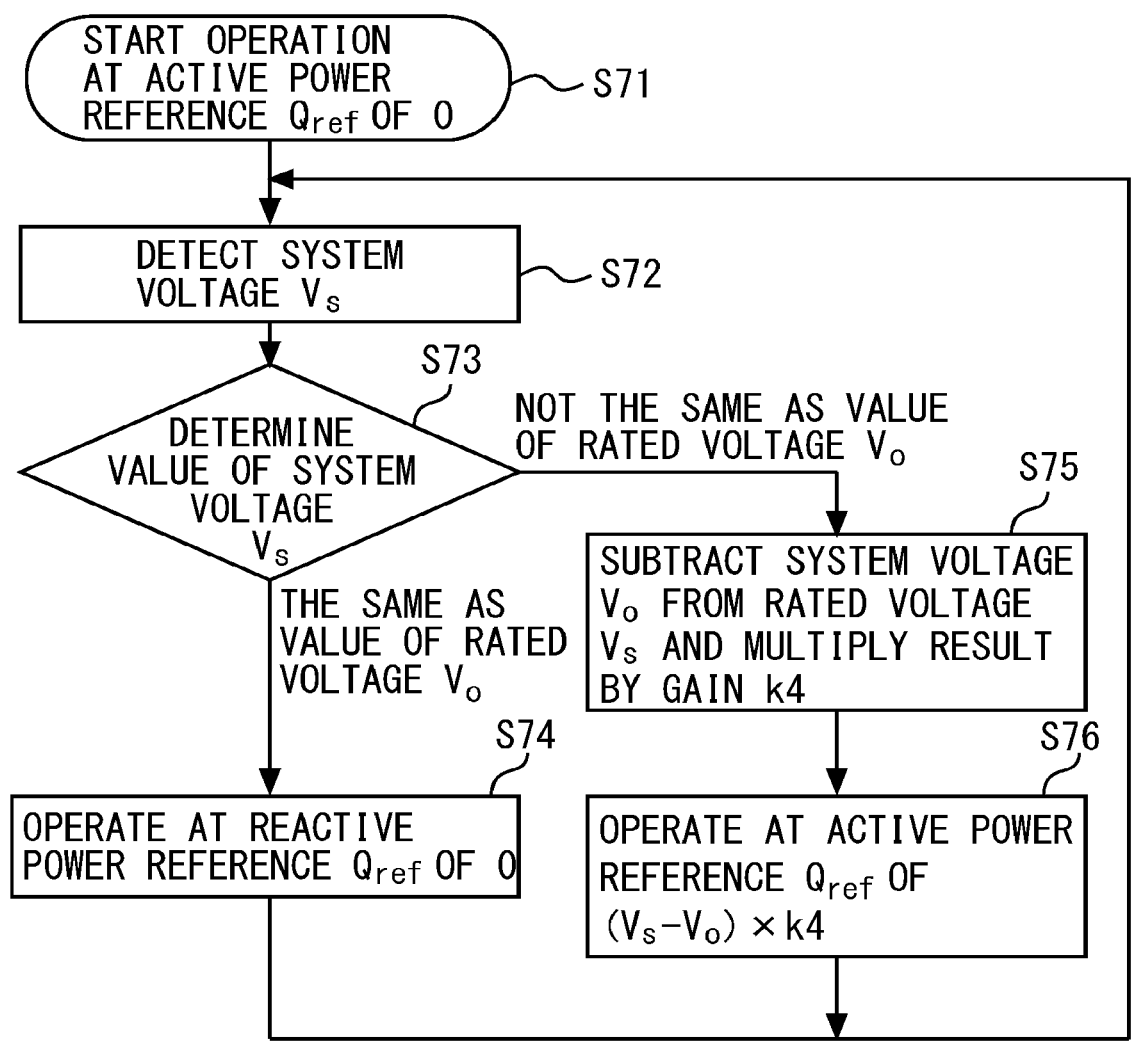
FIG. 14 is a flowchart for explaining a method for determining output reactive power as a current source by the control device for the power conversion device of the power conversion system in Embodiment 1.

FIG. 14 is a flowchart for explaining the method for determining output reactive power as a current source by the control device for the power conversion device of the power conversion system in Embodiment 1.

In step S71, the control device 14 starts operation at a reactive power reference $Q_{ref}$ of 0. The control device 14 then performs operation in step S72. In step S72, the control device 14 detects a system voltage $V_s$. The control device 14 then performs operation in step S73. In step S73, the control device 14 determines a value of the system voltage $V_s$.

In a case where the value of the system voltage $V_s$ is the same as the value of the rated voltage $V_0$ in step S73, the control device 14 performs operation in step S74. In step S74, the control device 14 operates at the reactive power reference $Q_{ref}$ of 0. The control device 14 then performs operation in step S72.

In a case where the value of the system voltage $V_s$ is not the same as the value of the rated voltage $V_0$ in step S73, the control device 14 performs operation in step S75. In step S75, the control device 14 subtracts the rated voltage $V_0$ from the system voltage $V_s$ and multiplies the result by the gain k4. The control device 14 then performs operation in step S76. In step S76, the control device 14 operates at the reactive power reference $Q_{ref}$ of $(V_s-V_0) \times k4$. The control device 14 then performs operation in step S72.

According to Embodiment 2 described above, in a case where the power converter 7 to be controlled is caused to perform autonomous operation as a voltage source in a state where the plurality of power converters 7 are connected in parallel, the control device 14 controls an amplitude of a voltage to be output by the power converter 7 to be controlled on the basis of reactive power output by the power converter 7 to be controlled and controls a frequency of the voltage to be output by the power converter 7 to be controlled on the basis of active power output by the power converter 7 to be controlled. In a case where the power converter 7 to be controlled is caused to perform linkage operation as a current source in a state where the plurality of power converters 7 are connected in parallel, the control device 14 controls active power to be output by the power converter 7 to be controlled on the basis of a frequency of a voltage at a linkage point of the plurality of power converters 7 and controls reactive power to be output by the power converter 7 to be controlled on the basis of an amplitude of the voltage at the linkage point of the plurality of power converters 7. It is therefore possible to appropriately supply power from the plurality of power converters 7 to the load 4 without the need of a common control device for the plurality of power converters 7.

Note that in a case where the power converter 7 to be controlled is caused to perform linkage operation as a current source, the control unit 16 in the control device 14 in Embodiment 1 and Embodiment 2 may adjust response times for controlling active power and reactive power to be output by the power converter 7 to be controlled on the basis of the amplitude and the frequency of the voltage at the linkage point of the plurality of power converters 7, within a required response range. In this case, it is possible to prevent part of the power converters 7 from excessively supplying power due to a minute detection error of a detector, a minute gap in a calculation timing of the control device 14, or the like, and prevent the other power converters 7 from absorbing the power. It is therefore possible to prevent occurrence of transmission and reception of power among the plurality of power converters 7 which function as a current source.

For example, the control unit 16 in the control device 14 which supports the plurality of power converters 7 which function as a current source may make settings such that differences in response times for controlling active power and reactive power to be output by the respective power converters 7 on the basis of the amplitude and the frequency of the voltage at the linkage point of the plurality of power converters 7 become the same. In this case, it is possible to prevent occurrence of transmission and reception of power among the plurality of power converters 7 which function as a current source.

For example, the control unit 16 in the control device 14 which supports the plurality of power converters 7 which function as a current source may make settings such that ratios of response times for controlling active power and reactive power to be output by the respective power converters 7 on the basis of the amplitude and the frequency of the voltage at the linkage point of the plurality of power converters 7 become the same. In this case, it is possible to prevent occurrence of transmission and reception of power among the plurality of power converters 7 which function as a current source.

For example, the control unit 16 in the control device 14 which supports the plurality of power converters 7 which function as a current source may set response times for controlling active power and reactive power to be output by the respective power converters 7 on the basis of the amplitude and the frequency of the voltage at the linkage point of the plurality of power converters 7 with random numbers. In this case, it is possible to prevent occurrence of transmission and reception of power among the plurality of power converters 7 which function as a current source.

For example, the control unit 16 in the control device 14 which supports the plurality of power converters 7 which function as a current source may change response times for controlling active power and reactive power to be output by the respective power converters 7 on the basis of the amplitude and the frequency of the voltage at the linkage point of the plurality of power converters 7 with conditions set in advance. For example, the control unit 16 may change the response times for each given period. In this case, it is possible to prevent variation in power consumption of the DC power supplies 1 as a result of the power converter 7 which has a faster response time responding first and the power converter 7 which has a slower response time responding later. It is therefore possible to make operation rates of the plurality of power converters 7 more even. As a result, it is possible to stably operate the power conversion system.

Note that a scheme of the power converter 7 is not limited. For example, the power converter 7 may be a single-phase power converter. For example, the power converter 7 may be a 2-level power converter. For example, the power converter 7 may be a neutral point clamp type multi-level power converter. For example, the power converter 7 may be a neutral point switch type multi-level power converter. For example, the power converter 7 may be a parallel-connected power converter. For example, the power converter 7 may be a serial-connected power converter. Also in these cases, it is possible to appropriately supply power from the plurality of power converters 7 to the load 4.

INDUSTRIAL APPLICABILITY

As described above, the control device 14 for the power conversion device 6 and the power conversion system of the present disclosure can be utilized in a system which converts power.

Reference Signs List

1 DC power supply
2 System
3 Voltage transforming device
4 Load
5 Switching device
6 Power conversion device
7 Power converter
8 Harmonic filter
9 Switch
10 First current detector
11 Second current detector
12 First voltage detector
13 Second voltage detector
14 Control device
15 Voltage recognizing unit
16 Control unit
17 First amplifier
18 Second amplifier
19 First adder
20 First integrator
21 First UVW/dq converter
22 First subtractor
23 Second subtractor
24 First d-axis voltage controller
25 Third subtractor
26 First q-axis voltage controller
27 First dq/UVW converter
28 Fourth subtractor
29 First low-pass filter
30 Fifth subtractor
31 First active power controller
32 Second d-axis current controller
33 Sixth subtractor
34 Second low-pass filter
35 Seventh subtractor
36 First reactive power controller
37 Second q-axis current controller
38 Second dq/UVW converter
39 Third amplifier 40 Fourth amplifier
41 Eighth subtractor
42 Second integrator
43 Second UVW/dq converter
44 Second adder
45 Ninth subtractor
46 Fifth d-axis voltage controller
47 Tenth subtractor
48 Fifth q-axis voltage controller
49 Third dq/UVW converter
50 Eleventh subtractor
51 Third low-pass filter
52 Twelfth subtractor
53 Second active power controller
54 Sixth d-axis current controller
55 Thirteenth subtractor
56 Fourth low-pass filter
57 Fourteenth subtractor
58 Second reactive power controller
59 Sixth q-axis current controller
60 Fourth dq/UVW converter
100a Processor
100b Memory
200 Hardware

The invention claimed is:

1. A control device for a power conversion device, the control device comprising:
    a voltage recognizing unit configured to detect a voltage at a linkage point of a plurality of power converters in a case where the plurality of power converters which convert DC power from a DC power supply into AC power are connected in parallel to a load; and
    a control unit configured to control an amplitude and a frequency of a voltage to be output by a power converter to be controlled on a basis of active power and reactive power output by the power converter to be controlled in a case where the power converter to be controlled is caused to perform autonomous operation as a voltage source in a state where the plurality of power converters are connected in parallel, and control active power and reactive power to be output by the power converter to be controlled so as to compensate for excess or deficiency of active power and reactive power at the linkage point on a basis of an amplitude and a frequency of the voltage detected by the voltage recognizing unit in a case where the power converter to be controlled is caused to perform linkage operation as a current source in a state where the plurality of power converters are connected in parallel.

2. The control device for the power conversion device according to claim 1,
    wherein the control unit controls the amplitude of the voltage to be output by the power converter to be controlled on a basis of the active power output by the power converter to be controlled and controls the frequency of the voltage to be output by the power converter to be controlled on a basis of the reactive power output by the power converter to be controlled in the case where the power converter to be controlled is caused to perform autonomous operation as a voltage source in the state where the plurality of power converters are connected in parallel, and controls the active power to be output by the power converter to be controlled on a basis of the amplitude of the voltage detected by the voltage recognizing unit and controls the reactive power to be output by the power converter to be controlled on a basis of the frequency of the voltage detected by the voltage recognizing unit in the case where the power converter to be controlled is caused to perform linkage operation as a current source in the state where the plurality of power converters are connected in parallel.

3. The control device for the power conversion device according to claim 1,
    wherein the control unit controls an amplitude of the voltage to be output by the power converter to be controlled on a basis of the reactive power output by the power converter to be controlled and controls the frequency of the voltage to be output by the power converter to be controlled on a basis of the active power output by the power converter to be controlled in the case where the power converter to be controlled is caused to perform autonomous operation as a voltage source in the state where the plurality of power converters are connected in parallel, and controls the active power to be output by the power converter to be controlled on a basis of the frequency of the voltage detected by the voltage recognizing unit and controls the reactive power to be output by the power converter to be controlled on a basis of the amplitude of the voltage detected by the voltage recognizing unit in the case where the power converter to be controlled is caused to perform linkage operation as a current source in the state where the plurality of power converters are connected in parallel.

4. The control device for the power conversion device according to claim 1,
    wherein the control unit is provided so as to be able to adjust response times for controlling the active power and the reactive power to be output by the power converter to be controlled on the basis of the amplitude and the frequency of the voltage detected by the voltage recognizing unit in the case where the power converter to be controlled is caused to perform linkage operation as a current source in the state where the plurality of power converters are connected in parallel.

5. A power conversion system comprising:
    a plurality of power converters connected in parallel to a load and configured to convert DC power from a DC power supply into AC power; and
    a voltage detector configured to detect a voltage at a linkage point of the plurality of power converters,
    a first part of the plurality of power converters performing autonomous operation as a voltage source, an amplitude and a frequency of a voltage to be output by the first part of the plurality of power converters being controlled on a basis of active power and reactive power output by the first part of the plurality of power converters,
    a second part of the plurality of power converters performing linkage operation as a current source, active power and reactive power to be output by the second part of the plurality of power converters being controlled to compensate for excess or deficiency of active power and reactive power at the linkage point on a basis of an amplitude and a frequency of the voltage detected by the voltage detector.

6. The power conversion system according to claim 5,
    wherein the amplitude of the voltage to be output by the first part of the plurality of power converters is controlled on a basis of the active power output by the first part of the plurality of power converters, and the frequency of the voltage to be output by the first part of the plurality of power converters is controlled on a basis of the reactive power output by the first part of the plurality of power converters, and the active power to be output by the second part of the plurality of power converters is controlled on a basis of the amplitude of the voltage detected by the voltage detector, and the reactive power to be output by the second part of the plurality of power converters is controlled on a basis of the frequency of the voltage detected by the voltage detector.

7. The power conversion system according to claim 5, wherein the amplitude of the voltage to be output by the first part of the plurality of power converters is controlled on a basis of the reactive power output by the first part of the plurality of power converters, and the frequency of the voltage to be output by the first part of the plurality of power converters is controlled on a basis of the active power output by the first part of the plurality of power converters, and the active power to be output by the second part of the plurality of power converters is controlled on a basis of the frequency of the voltage detected by the voltage detector, and the reactive power to be output by the second part of the plurality of power converters is controlled on a basis of the amplitude of the voltage detected by the voltage detector.

8. The power conversion system according to claim 5, wherein the second part of the plurality of power converters is provided so that response times for controlling the active power and the reactive power to be output by each of the first part and the second part of the plurality of power converters on the basis of the amplitude and the frequency of the voltage detected by the voltage detector can be adjusted.

9. The power conversion system according to claim 8, wherein the second part of the plurality of power converters is set so that differences in the response times for controlling the active power and the reactive power to be output by each of the first part and the second part of the plurality of power converters on the basis of the amplitude and the frequency of the voltage detected by the voltage detector become the same.

10. The power conversion system according to claim 8, wherein the second part of the plurality of power converters is set so that ratios of the response times for controlling the active power and the reactive power to be output by each of the first part and the second part of the plurality of power converters on the basis of the amplitude and the frequency of the voltage detected by the voltage detector become the same.

11. The power conversion system according to claim 8, wherein the response times of the second part of the plurality of power converters for controlling the active power and the reactive power to be output by each of the first part and the second part of the plurality of power converters on the basis of the amplitude and the frequency of the voltage detected by the voltage detector are set with random numbers.

12. The power conversion system according to claim 8, wherein the response times of the second part of the plurality of power converters for controlling the active power and the reactive power to be output by each of the first part and the second part of the plurality of power converters on the basis of the amplitude and the frequency of the voltage detected by the voltage detector are changed with a condition set in advance.

* * * * *